(No Model.) 4 Sheets—Sheet 1.

W. T. DUVALL.
BRICK MACHINE.

No. 373,134. Patented Nov. 15, 1887.

ON LINE 1—1

Attest.
Sidney P. Hollingsworth
Wm. H. Shipley

Inventor.
W. T. Duvall
By Philip T. Dodge,
Attorney (No Model.) 4 Sheets—Sheet 2.
W. T. DUVALL.
BRICK MACHINE.
No. 373,134. Patented Nov. 15, 1887.
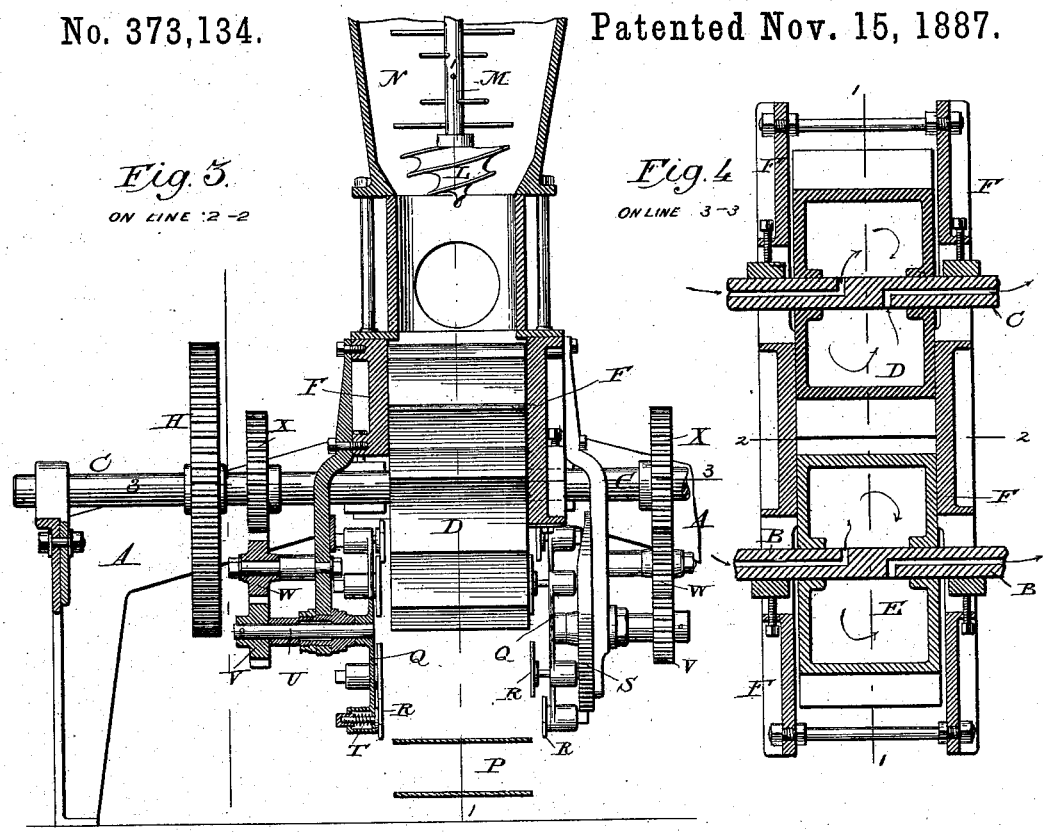
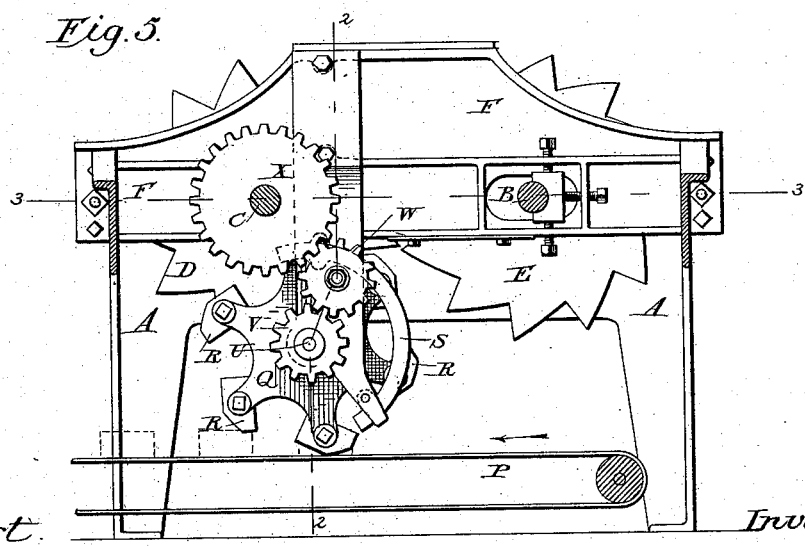
Attest.
Sidney P. Hollingsworth
Wm. H. Shipley
Inventor.
W. T. Duvall
By his Atty.
Phil. T. Dodge
N. PETERS, Photo-Lithographer, Washington, D. C.

(No Model.) 4 Sheets—Sheet 3.

W. T. DUVALL.
BRICK MACHINE.

No. 373,134. Patented Nov. 15, 1887.

Attest.
Sidney P. Hollingsworth
Wm L. Kennedy

Inventor.
W. T. Duvall
By his Atty
Phil T. Dodge (No Model.) 4 Sheets—Sheet 4.
W. T. DUVALL.
BRICK MACHINE.
No. 373,134. Patented Nov. 15, 1887.
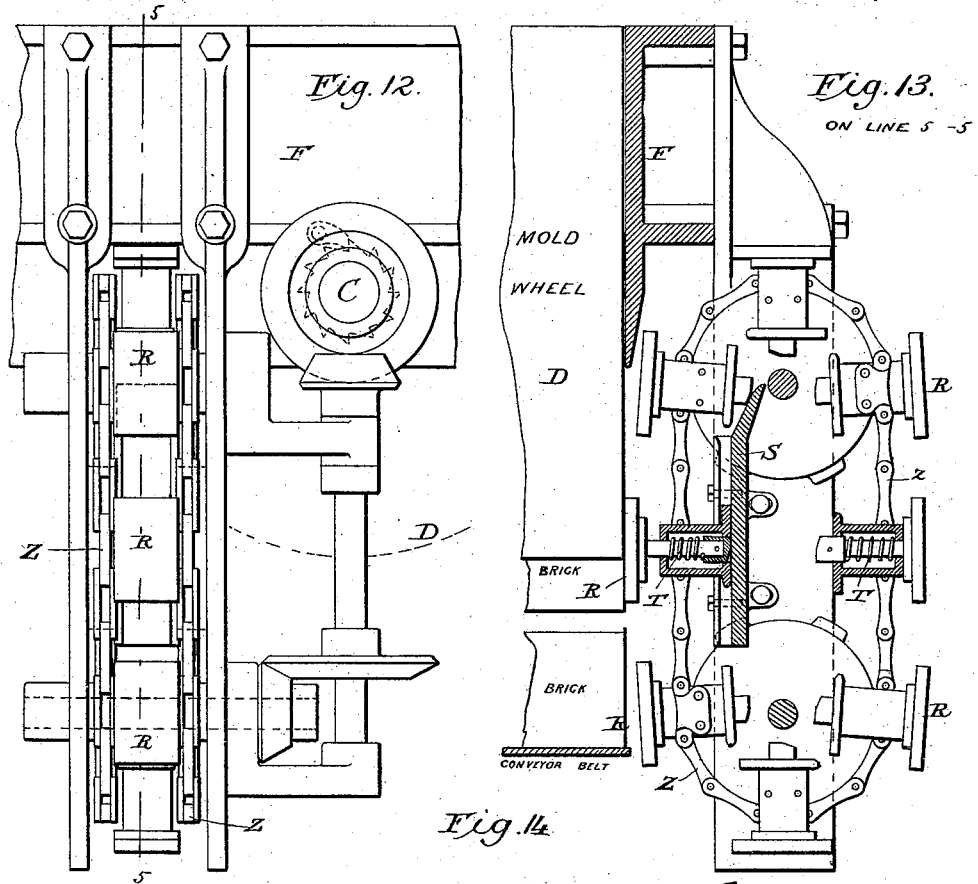
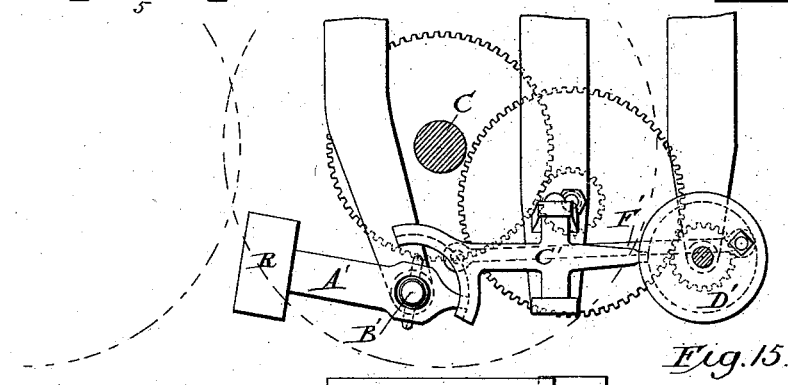

United States Patent Office.

WILLIAM T. DUVALL, OF WASHINGTON, DISTRICT OF COLUMBIA, ASSIGNOR OF ONE-HALF TO HARRY W. BLOUNT, OF SAME PLACE.

BRICK-MACHINE.

SPECIFICATION forming part of Letters Patent No. 373,134, dated November 15, 1887.

Application filed July 22, 1886. Serial No. 208,771. (No model.)

*To all whom it may concern:*

Be it known that I, WILLIAM TELL DUVALL, of Washington, in the District of Columbia, have invented certain Improvements in Brick-Machines, of which the following is a specification.

The aim of my invention is to provide a machine of extreme simplicity and great durability by which brick may be formed with a small expenditure of power from tempered clay, and the brick thus formed delivered without mutilation to an off-bearing belt or its equivalent.

To this end the invention consists, substantially, in the combination of two rotary mold-wheels provided in their periphery with complementary cells, the walls of which give form to the side faces of the brick, said walls being arranged to engage or interlock those on one wheel with those on the other, and combined with stationary side plates or cheek-plates, which close the ends of the cells and give form to the ends of the brick.

It also further consists in the combination, with the mold-wheel, as above described, of movable plates to remove the brick, the plates being thrown into and out of contact by means hereinafter explained.

Figure 1:
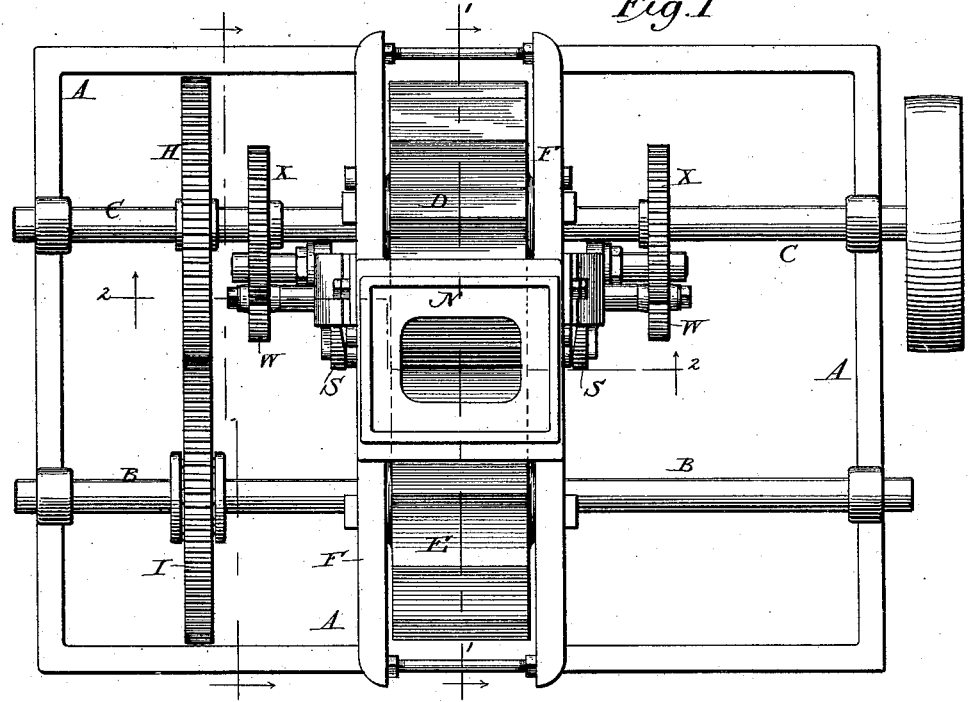
Figure 2:
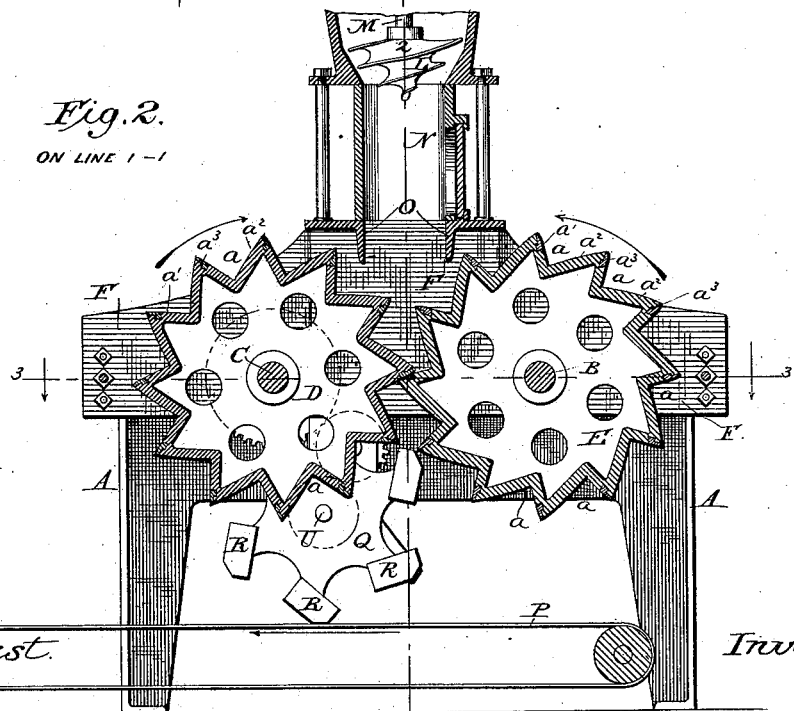
Figure 6:
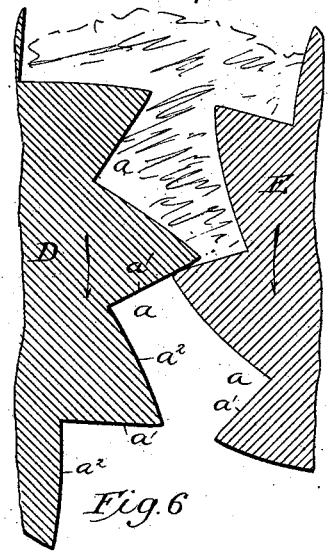
Figure 7:
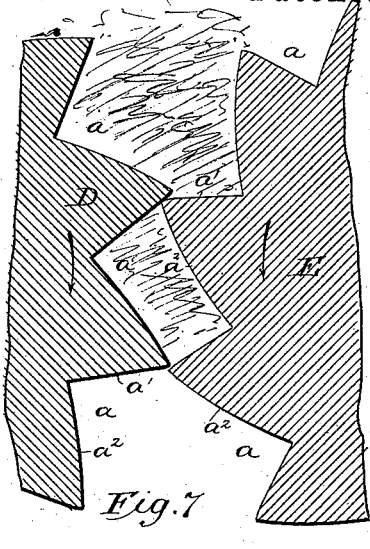
Figure 8:
Figure 9:
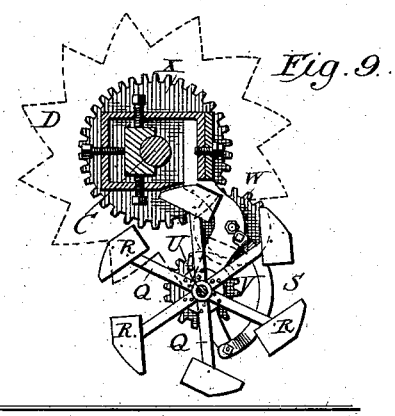
Figure 10:
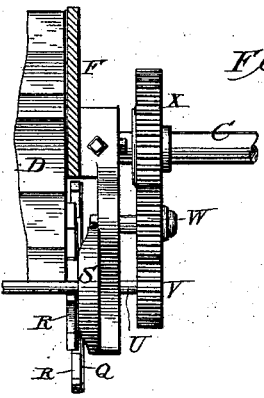
Figure 11:
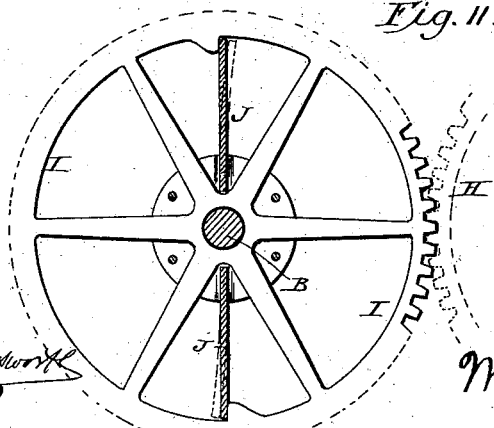

In the accompanying drawings, Figure 1 is a top plan view of my machine. Fig. 2 is a vertical section of the same on the line 1 1 of Fig. 2. Fig. 3 is a vertical cross-section on the line 2 2 of Figs. 1 and 2. Fig. 4 is a horizontal cross-section on the line 3 3 of Figs. 2 and 5. Fig. 5 is a side elevation of the machine, a portion of the main frame being broken away to show the devices for delivering the brick. Figs. 6, 7, and 8 are vertical sections on a large scale through the adjacent faces of the mold-wheel, showing the successive forms assumed by the mold-cells during the formation and delivery of the brick. Figs. 9 and 10 are, respectively, a side elevation and an edge view of the delivering mechanism in modified form. Fig. 11 is a view showing the yielding devices for driving one of the mold-wheels. Fig. 12 is a side view, and Fig. 13 a vertical section on the line 5 5, showing the delivering mechanism in still another form. Fig. 14 is a side view of another delivering mechanism. Fig. 15 is a plan view of the parts shown in the preceding figure.

In the drawings, A represents a rigid main frame, which may be of any appropriate form, provided with bearings to sustain the ends of two horizontal parallel shafts, B and C, which pass through and are secured to the mold-wheels D and E, respectively, revolving between vertical side plates, F, fixed in position. Each mold-wheel is formed at the periphery with a series of transverse pockets or indentations, $a$, extending in the direction of the axis from one side to the other. In practice I have found it desirable to form each wheel with twelve cells, as this number, for various reasons unnecessary to explain, gives better results than are otherwise attainable. The two wheels are made with an equal number of cells or pockets and arranged at such distance apart that the teeth or shoulders of one wheel will slightly overlap or engage upon the teeth of the opposite wheel, as shown in Figs. 2, 6, 7, and 8. I construct each cell, as shown, with one substantially flat wall, $a'$, to give form to the edge of the brick, and with an outwardly-curved or convex surface, $a^2$, to give form to the side faces of the brick.

The wheels revolve at their ends closely against the inner faces of the cheek-plates F, which are extended upward, as shown, above the top of the wheels, thus closing the cells at their ends, and also closing the space between the upper portion of the wheels, so that it serves as a hopper to confine the clay and direct the same downward between the wheels.

As the wheel D revolves, one of its teeth on the inner descending side will overlap or bear upon the edge of the corresponding teeth on the edge of wheel E, as shown in Figs. 2 and 6. At this time there will be an open space between the next succeeding teeth, through which the clay will enter and fill the opposing cells of the two wheels and the intervening space, as shown in Fig. 6. As the wheels continue their rotation, the teeth first engaged will descend and finally separate; but just previous to their separation the next succeeding teeth will engage, as shown in Fig. 7, thus cutting off the charge which has already entered the cells and separating it entirely from the mass of clay above before the teeth separate at its lower side, as plainly shown in Fig. 7. It will be observed that while the charge of clay is being thus carried downward between the wheels it is at one time entirely inclosed between the surfaces of the two wheels on opposite faces and the cheek-plates at the end. As the movement of the parts continues, the teeth which first encountered each other gradually separate at the under side, as shown in Fig. 8, allowing the finished brick to escape between them.

The brick receives its true rectangular form in cross-section through the direct action of the opposing faces $a'$ and the curved surfaces $a^2$, which, opposing each other and acting on opposite sides of the brick, move in such relation to each other that they roll the brick outward between them, shaping it gradually from one edge to the other.

I give the teeth the peculiar form described and shown as a result of long-continued practical experiment, and because I find in practice that thus formed they will deliver brick of soft or tempered clay with certainty in a true rectangular shape.

The machine may be operated by a power applied to the shaft C through a pulley or otherwise, and motion may be communicated from the wheel D to the wheel E, through their teeth or through connecting-gears H and I, applied to their shafts as shown. When these gears are employed, I recommend that the gear I be mounted on the shaft B and arranged to engage elastic arms J, secured to the shaft or a hub thereon, as shown in Fig. 11. This construction will insure a close contact between the teeth of the two mold-wheels, prevent backlash of the gear, and permit the parts to yield in the event of stone or refractory material entering between the mold-wheels.

In order to prevent the adhesion of the brick to the wheel, and to insure their delivery at the desired point, I find it advisable to apply heat to the mold-wheels. This may be effected by the introduction of steam or hot air, or in any other suitable manner.

I commonly construct the shafts, as shown in Fig. 4, of a tubular form within the interior of the wheel, so that steam may be introduced through one end and discharged through the other.

I propose to employ, in connection with the mold-wheels, appropriate feed mechanism to deliver the clay in a downward direction thereto. An excellent means for this purpose consists of a revolving screw, L, attached to the lower end of a revolving shaft, M, provided with radial arms or agitators and mounted in the lower part of a hopper, N, bolted to the top of the cheek-plates. Plates O, extending downward at the mouth of this hopper above the feed-wheel, prevent the escape of the clay from the top of the wheels.

In order to permit the rapid operation of the mold-wheels, it is necessary to provide automatic means for carrying away the brick as they are delivered therefrom, and also means to prevent injury to the brick in the course of their delivery to the off-bearing devices. For off-bearing purposes I commonly employ a horizontal apron, P, arranged directly underneath the machine, as shown in Figs. 2, 3, and 5. This belt will be sustained by rollers and driven by any appropriate mechanism.

For the purpose of receiving the brick from the mold-wheel and placing the same upon the belt, I provide at opposite sides of the machine two vertically-revolving wheels, Q, each carrying a series of vertical plates, R, having horizontal spindles U, which are extended outward through bearings in the wheel in position to travel against the faces of stationary cam-plates S. Springs T, encircling these spindles, tend to force the plates outward. As the wheels revolve, the plates are brought successively into position opposite the brick which are being delivered from the mold-wheel, and as each plate reaches a position directly opposite the brick it is forced and held inward by the adjacent cam-plate S snugly against the brick, the brick being thus held between two plates against opposite ends and carried downward thereby until it reaches the apron, whereupon the plates are released by the cams and immediately retreat, allowing the brick to move off from the apron. The delivery-wheels Q, as shown in Figs. 1 and 2, are mounted on independent horizontal shafts U, supported in fixed bearings and driven through intermediate gears, V, W, and X, from the main shaft C.

It is to be remarked that the path of the plates R approximates that of the cells containing the brick, but that, being slightly eccentric thereto, the plates carry the brick gradually from the mold, moving them downward with sufficient rapidity to prevent them from being mutilated by contact with the teeth. Instead of attaching the delivery-plates R to the sliding spindle and employing separate springs to retract them, they may be attached, as in Figs. 9 and 10, to elastic arms forming part of the wheel Q, the arms traveling against the supporting-cam S.

If the conditions are such that it is necessary to carry the brick downward a considerable distance from the mold-wheel, I recommend the attachment of the carrier-plates R to endless chains Z, as shown in Figs. 12 and 13. The plates will be constructed with horizontal spindles and encircled by retracted springs in precisely the same manner as in Fig. 3; but the sockets in which the spindles and springs are seated are carried by the chains instead of the wheels. In such case the chains will be supported at their upper and lower ends by pulleys driven by suitable gearing from the main shaft. Stationary cam-plates S are arranged in substantially the same manner as in the preceding examples to act upon the rear ends of the spindles, in order to force the plates outward to grasp the brick and hold them outward until the brick have descended to the carrying-apron. The use of these endless carrier-chains is also advantageous, in that they enable me to safely deliver the brick on edge upon the apron.

Figs. 14 and 15 represent another modification of this delivering mechanism. R represents the delivery-plate secured to the end of an arm, A', united by a transverse pivot to a rock-shaft, B', so that it may receive both a vertical and a horizontal vibration. This arm has a heel projection, which enters a vertical slot in an arm, C', pivoted to swing horizontally and vibrated at suitable times by a grooved cam-wheel, D', in which the rear end of the arm is seated. The crank-shaft E', attached to the rock-shaft, is connected by a pitman, F', to a second crank, G', on the shaft which carries the cam-wheel D'. This shaft is provided with a driving-wheel, H', and driven by intermediate gear from the main shaft or any other appropriate part of the machine. The rocking motion of the shaft G' raises and lowers the plate R, while the lever C' controls its horizontal movement. The parts are so timed that the plate, being lifted, moves inward against the end of the brick and then swings downward, continuing its pressure against the brick until the latter has reached the off-bearing belt or other receiver, after which the plate moves outward and rises to its original position.

Referring again to the mold-wheels, it is to be remarked that the employment of the connecting-gear for transmitting motion from one to the other is not a necessity, as the action of the teeth of one wheel upon those of the other will communicate the required movement. The clay under compression between the wheels will also assist in transmitting this motion, and thus relieve the teeth to an extent from the friction and wear to which they would otherwise be subject.

One of the important advantages arising from the use of yielding gear, as represented in Fig. 11 and before described, lies in the fact that the co-operating teeth of the mold-wheels are thus held constantly in intimate contact.

In order to prevent undue wear on the corners or points of the teeth of the mold-wheel, I propose to provide them, as shown in Fig. 2, with steel or other hard-metal faces $a^3$, which may be shaped, as shown, to admit of their being driven into dovetail grooves or be otherwise formed and secured in place.

While I have shown the particular form or curvature of the mold-wheels best adapted for the formation of brick of the ordinary size at present in general use, it is to be understood that the curvature of the faces may be modified, as may be demanded, for the formation of brick of other sizes, or by the variation in the number of cells in the mold-wheels, the only requirement in this regard being that the opposing surfaces of the two wheels shall bear such relation to each other as to give flat faces to the brick formed between them.

I am aware that two wheels having complementary cells have been arranged to revolve at their opposing edges between side plates. These wheels, however, did not have overlapping teeth and did not have cells with curved surfaces, as described herein. In these respects and in various other respects unnecessary to enumerate my machine differs materially therefrom. Without the overlapping teeth a machine of the present type is utterly worthless.

I am aware that two polygonal wheels having cells in their peripheral faces have been combined in a brick-machine, one wheel being mounted in sliding bearings and combined with lifting-cams; and to such combination, in which the shoulders or lips of the teeth did not interlock or overlap, I lay no claim.

Having thus described my invention, what I claim is—

1. In a brick-machine, the combination of the two mold-wheels with parallel axes provided with complementary cells $a$ in the periphery and arranged to interlock or intermesh at the edges of their cells, as described, whereby the charges of clay are supported and confined at the under side, as described, during the operation of molding them into the required form.

2. In a brick-machine, the combination of two co-operating intermeshing mold-wheels, D and E, provided with peripheral cells or cavities and arranged, as described, so that the teeth of one wheel engage with those of the other and that each pair of teeth engages previous to the disengagement of the preceding pair, whereby each charge of clay is completely inclosed and separated from the superincumbent mass before an opening is afforded at the under side.

3. The two co-operating wheels D and E, provided with complementary peripheral cells, as described and shown, each cell having a flat face, $a'$, and a convex face, $a^2$, whereby the cells are adapted, when revolving toward each other, to give a rectangular form to the brick.

4. In combination with mold-wheels D and E, having peripheral cells, substantially as described, connecting-gear embracing the yielding or spring member, substantially as described, whereby a constant but yielding contact is maintained between the mold-wheels.

5. In a brick-machine, the combination of two side walls, two intermediate wheels having parallel stationary axes in the same or substantially the same horizontal planes, each wheel provided with a series of peripheral cells and one arranged to intermesh or interlock with the other at the periphery, as described, and a feed device, substantially as described, arranged above and between said wheels and acting to deliver the clay in a downward direction between them.

6. In combination with the mold-wheels, substantially as described, movable plates to engage the end of the brick as they are delivered from the wheels, and means, substantially as described, for lowering said plates and for moving them into and out of contact with the brick.

7. In combination with the mold-wheels, horizontally-movable plates R, movable carriers wherein said plates are mounted, springs to effect the retraction of the plates, and cam plates or tracks to advance them against the ends of the brick, substantially as described.

8. In combination with the two mold-wheels, substantially as described, the off-bearing belt and an intermediate carrying mechanism, substantially as described, acting on the ends of the brick to transfer them from the mold-wheel to the carrier-apron.

In testimony whereof I hereunto set my hand this 13th day of July, 1886, in the presence of two attesting witnesses.

WILLIAM T. DUVALL.

Witnesses:
P. T. DODGE,
WM. H. SHIPLEY.